United States Patent [19]
Thompson

[11] Patent Number: 5,083,852
[45] Date of Patent: Jan. 28, 1992

[54] LASER BEAM STOP

[75] Inventor: Richard B. Thompson, Baltimore, Md.

[73] Assignee: United States of America as represented by the Secretary of the Navy, Washington, D.C.

[21] Appl. No.: 531,422

[22] Filed: May 31, 1990

[51] Int. Cl.[5] ............... G02B 26/02; G01N 21/51
[52] U.S. Cl. ........................... 359/886; 356/440
[58] Field of Search ..................... 350/266-268, 350/312, 319; 372/11, 103; 356/336-338, 436, 440

[56] References Cited

U.S. PATENT DOCUMENTS

| | | | |
|---|---|---|---|
| Re. 28,753 | 3/1976 | Zanody | 372/103 |
| 3,390,351 | 6/1968 | Bell | 372/103 |
| 3,709,584 | 1/1973 | Frungel | 350/266 |
| 3,859,539 | 1/1975 | Allington | 250/575 |
| 5,020,884 | 6/1991 | Murphy | 350/267 |

Primary Examiner—Bruce Y. Arnold
Assistant Examiner—James Pham
Attorney, Agent, or Firm—Thomas E. McDonnell; Thomas V. Flanagan; Barry A. Edelberg

[57] ABSTRACT

A laser beam stop is contructed having a uniquely designed cell filled with a solution or suspension of an absorbing species chosen to absorb the wavelength of light emitted by the laser. The position and strength of the laser beam are indicated by the strength and depth of penetration of the fluorescence excited by the laser.

12 Claims, 1 Drawing Sheet

LASER BEAM STROP

BACKGROUND OF THE INVENTION

1. Field of the Invention

This invention relates to a beam stop for moderate to high power lasers that indicates the presence and strength of the laser beam.

2. Description of the Prior Art

There are three common problems in the laser laboratory. First, it is often necessary to block a laser beam in order to adjust another part of the instrument or experiment. It is typically more convenient to block the beam than to shut off the laser. While devices are offered or can be improvised for this purpose, they often produce specular reflections that are an eye hazard, particularly with invisible (e.g. UV or IR) laser beams. It is desirable that beam blocks reflect none (and thus absorb all) of the incident radiation. While some lasers have built-in beam blocks, these can be inconvenient to reach. For higher energy lasers, the block must also absorb a considerable amount of energy in a small volume.

Second, it is often useful to use a photoluminescent laser target to judge the mode structure (shape) and strength of the laser beam. While instruments are available to do this, they often are less convenient and no more accurate for the usual minor adjustments that are performed to optimize the laser output. Unfortunately, the fluorescent cards commonly used for this purpose produce a very small, bright spot when hit by the beam, which makes it difficult to judge the strength of the beam, especially in a darkened room. Moreover, these fluorescent cards are bleached or destroyed by stronger laser beams.

Third, laser beams from visible lasers are difficult to see from the side and pose a safety hazard, unless a scatterer in present, such as dust in the air. Unfortunately, lasers are typically used in clean environments, and beams strong enough to cause eye damage from specular reflection can be impossible to see. With UV and IR laser beams, the beam can be very dangerous without any visible effect.

Thus it would be useful to have a device that can serve as a beam block and indicate the strength, direction, and position of a laser beam, and entirely absorb the energy incident upon it from the laser.

SUMMARY OF THE INVENTION

Accordingly, it is an object of this invention to block a laser beam without specular reflection.

It is also an object of this invention to provide a laser beam stop that indicates the position, shape and relative strength of the beam.

It is a further object of this invention to provide a laser beam stop that will permit rapid optimization the output of the laser.

It is also an object of this invention to provide a laser beam stop that can indicate secondary reflections of laser beams off apparatus and the direction of those reflections.

It is an object of this invention to provide a laser beam stop that can be used with any laser with polarized output between 200 and 1200 nanometers, or over a wider range if other materials are substituted.

Finally, it is an object of this invention to provide a laser beam stop that can be scaled up for very high power lasers.

These and other objects of the invention are accomplished by constructing a uniquely designed cell filled with a solution or suspension of an absorbing species chosen to absorb the wavelength of light emitted by the laser. The position and strength of the laser beam are indicated by the strength and depth of penetration of the fluorescence excited by the laser.

BRIEF DESCRIPTION OF THE DRAWINGS

A more complete appreciation of the invention will be readily obtained by reference to the following Detailed Description of the Invention and the accompanying drawings in which like numerals in different figures represent the same structures or elements, wherein.

DETAILED DESCRIPTION OF THE INVENTION

Figure 1:
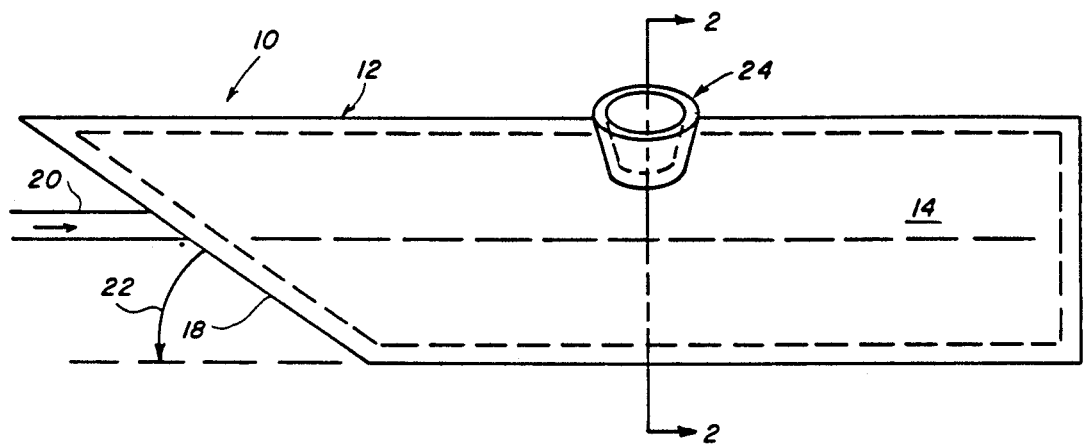
FIG. 1 is a side-view of the laser beam stop.
Figure 2:
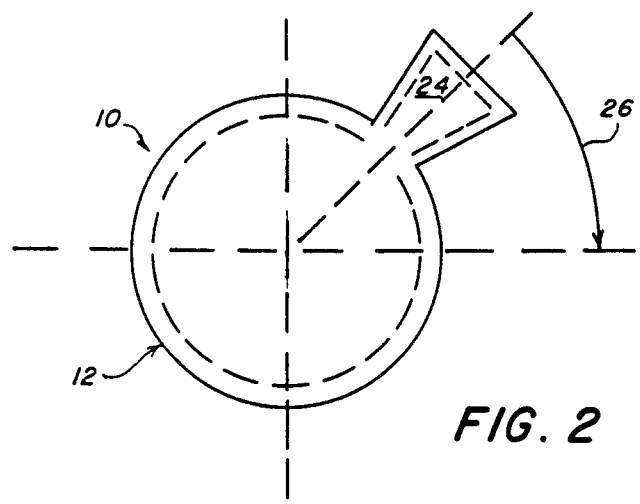
FIG. 2 is a cross section of the laser beam stop of FIG. 1 at 2,2.
Figure 3:
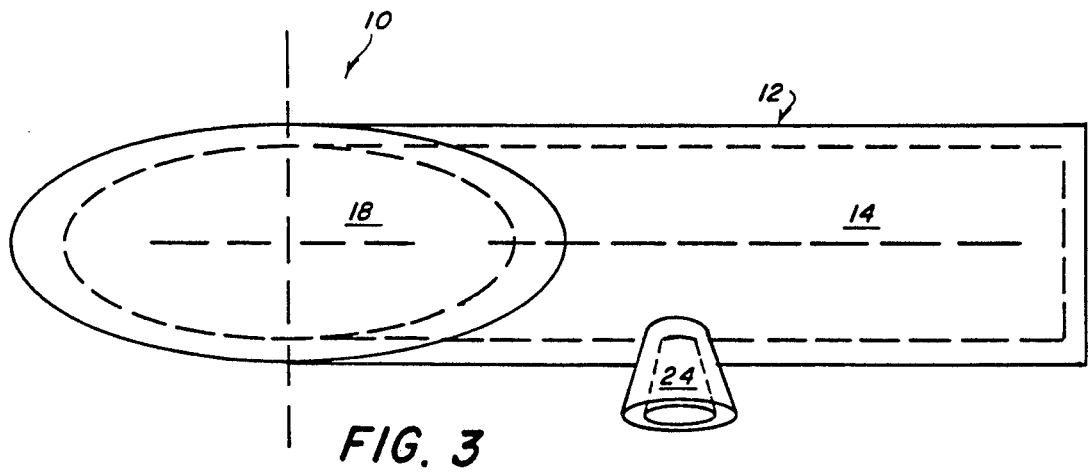
FIG. 3 is a bottom view of the laser beam stop.

The invention, as represented by FIGS. 1, 2, and 3 is a beam stop (10) comprises two main elements—a cell or cuvette (12), hereinafter referred to generically as a cell, and an absorbing fluid (14) contained within the cell, the absorbing fluid (14) consisting of a solvent or carrier liquid and an absorbing species dissolved in the solvent or suspended within the carrier liquid. The cell must be made of material that is transparent through the wavelength of the laser of interest. Therefore, one would choose the material based on the wavelength of laser used. The preferred materials are glass, plastic, and fused silica quartz, due to its transparency throughout the wavelength regions. For other wavelength regions, other materials may be appropriate. For example, if the laser is in the far UV region, sapphire is preferred.

An important feature of the invention is the design of the cell. As shown in FIGS. 1 and 3, the cell (12) is constructed so that the planar face of the cell (18) upon which the incident laser beam (20) (traveling in the direction indicated by the arrow) is oriented at Brewster's angle (22) to the beam. This angle can be easily calculated depending on the polarization of the beam, the wavelength of interest, and the cell material. The purpose of orienting the cell face at Brewster's angle is that the laser beam passes into the cell essentially without loss of radiation and therefore with little or no specular reflection. There must also be an opening (24) in the cell for placing the absorbing fluid within the cell and preventing leakage and spillage of the fluid. Preferably, this is any standard taper ground joint. Most preferably, the joint is a TS-9 Pennyhead. The opening (24) should also be placed at an angle (26) as shown in FIG. 2, so that when the laser beam stop is in use with laser beams having vertical or horizontal polarization, the fluid does not leak out. Preferably, the opening is at a 45° angle.

The absorbing species must absorb the wavelength of light emitted by the laser. Preferably, the species is a dye. In addition, if one desires to both block and indicate the presence of the beam, the radiation of the beam must also be converted into visible light by the absorbing species. For lasers emitting in the ultraviolet and visible ranges preferred dyes include those used in dye lasers and other common fluorescent dyes. Most preferably, the dye is selected from the group comprising fluorescein, rhodamine, and 7-hydroxy-4-methyl coumarin. For laser beams in the IR range, it is preferable to use photoluminescent materials so that the IR radiation is upconverted into the visible spectrum. It is important to note that the quantum yield need not be particularly high to be useful. Note that if the indicating (fluorescent) property is not desirable or necessary, the device can serve as a beam block in any region of the optical spectrum simply by including any absorbing species in a suitable solvent.

The concentration of absorbing species within the fluid should be such as to give an optical density of about 0.2 or greater at the laser wavelength. This assures that all incident laser energy is absorbed within the cell. The species need not be dissolved in a solvent. For instance, if photoluminescent materials are used in the case of an IR laser, these materials can be suspended in a carrier liquid rather than dissolved.

The solvent or carrier liquid for the absorbing species must be relatively transparent and able to dissolve or suspend the species. Relatively transparent means that the solvent or carrier liquid should absorb less than about 1% of the light. Preferably, the solvent or carrier liquid should also be readily available, have a low vapor pressure, and be non-toxic and non-flammable. In the case of high power lasers, the solvent or carrier liquid must also have a high heat capacity so that the solvent or carrier liquid will absorb the light without getting hot. Most preferably, the solvent or carrier liquid is water.

Having described the invention, the following examples are given to illustrate specific applications of the invention. These specific examples are not intended to limit the scope of the invention described in this application.

EXAMPLE

A laser beam stop, represented in FIGS. 1, 2, and 3 was constructed for use in blocking and indicating a laser beam polarized vertically, hitting the cell from the left, and having a wavelength of 488 nanometers, the cell being made of fused quartz. Brewster's angle was calculated to be 36 degrees, 50 minutes.

The stop was 3 inches long with a 1 inch outside diameter and a wall thickness of 1/16 inch. A solution of fluorescein in water was used as the absorbing material.

The laser beam was successfully blocked by the stop with no specular reflection.

What I claim is:

1. A laser beam stop comprising a cell having a planar surface oriented at Brewster's angle to a selected laser beam traveling toward said planar surface from a laser external to said cell and an absorbing liquid in the cell, the cell having an opening for placing and keeping the absorbing liquid within the cell.

2. A laser beam stop as described in claim 1 wherein the cell is made of a transparent material.

3. A laser beam stop as described in claim 2 wherein the material is selected from the group consisting of fused quartz, sapphire, plastic and glass.

4. A laser beam stop as described in claim 3 wherein the material is fused quartz.

5. A laser beam stop as described in claim 1 wherein the absorbing fluid consists of a solvent or carrier liquid and an absorbing species.

6. A laser beam stop as described in claim 5 wherein the absorbing species is photoluminescent or fluorescent.

7. A laser beam stop as described in claim 1 wherein the absorbing liquid converts the laser beam into the visible spectrum.

8. A laser beam stop as described in claim 1 wherein the absorbing liquid has an optical density of about 0.2 or greater.

9. A laser beam stop comprising a cell having a planar surface oriented at Brewster's angle to a selected laser beam and an absorbing fluid in the cell, the cell having an opening for placing and keeping the absorbing fluid within the cell, wherein the absorbing fluid consists of a solvent or carrier liquid and an absorbing species, and wherein the solvent or carrier liquid absorbs less than about 1% of the light and either dissolves or suspends the absorbing species.

10. A laser beam stop as described in claim 9 wherein the solvent or carrier liquid is non-toxic, non-flammable, readily available, and has a low vapor pressure.

11. A laser beam stop as described in claim 10 wherein the solvent or carrier liquid is water.

12. A laser beam stop comprising a cell having a planar surface oriented at Brewster's angle to a selected laser beam and an absorbing fluid in the cell, the cell having an opening for placing and keeping the absorbing fluid within the cell, wherein the opening in the cell is a standard taper ground joint.

* * * * *